May 5, 1931. G. LOWKRANTZ 1,803,398
LIGHT CONTROL FOR PRINTERS
Filed March 26, 1928 4 Sheets-Sheet 1

INVENTOR.
GUNNE LOWKRANTZ.
BY
ATTORNEY

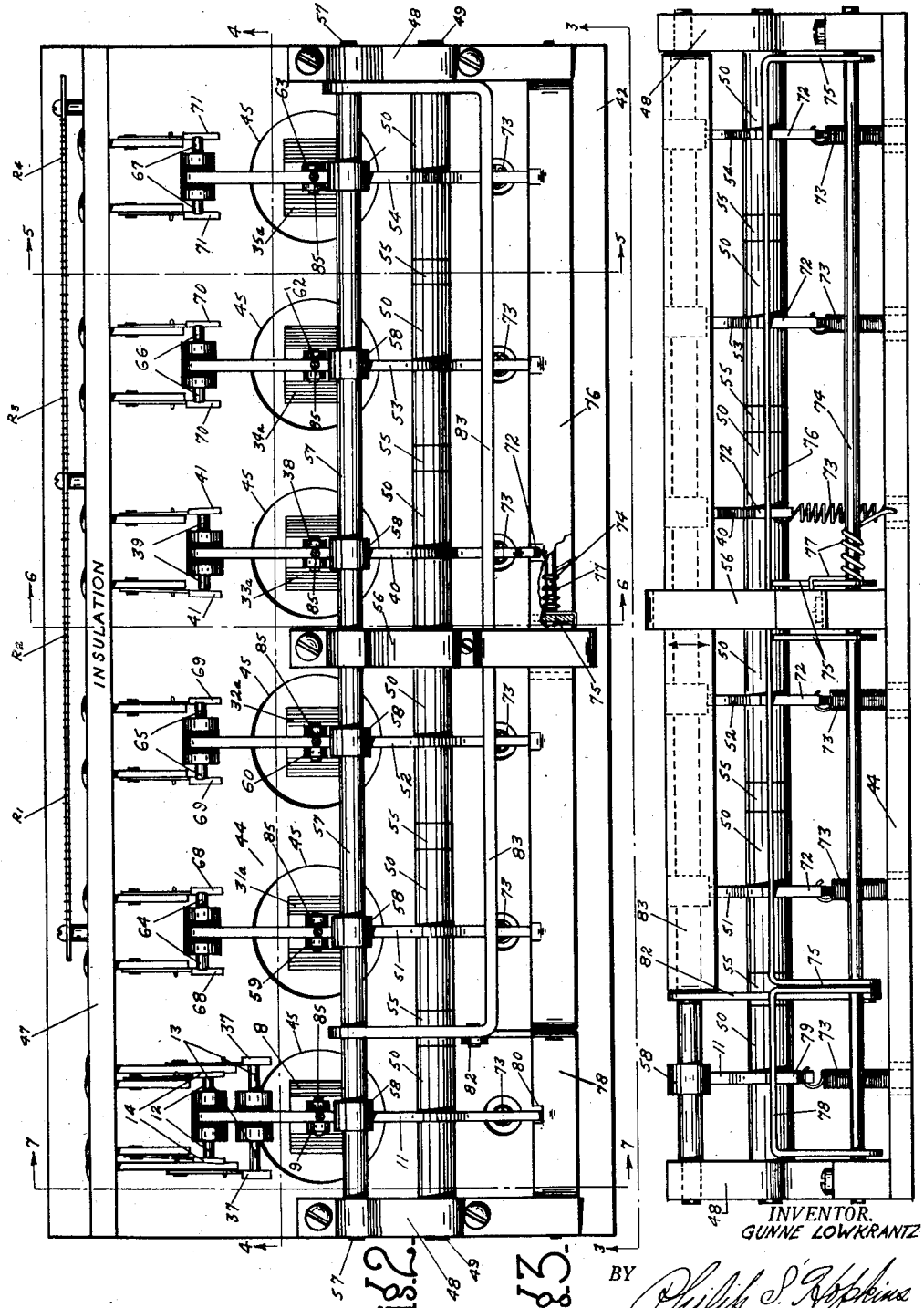

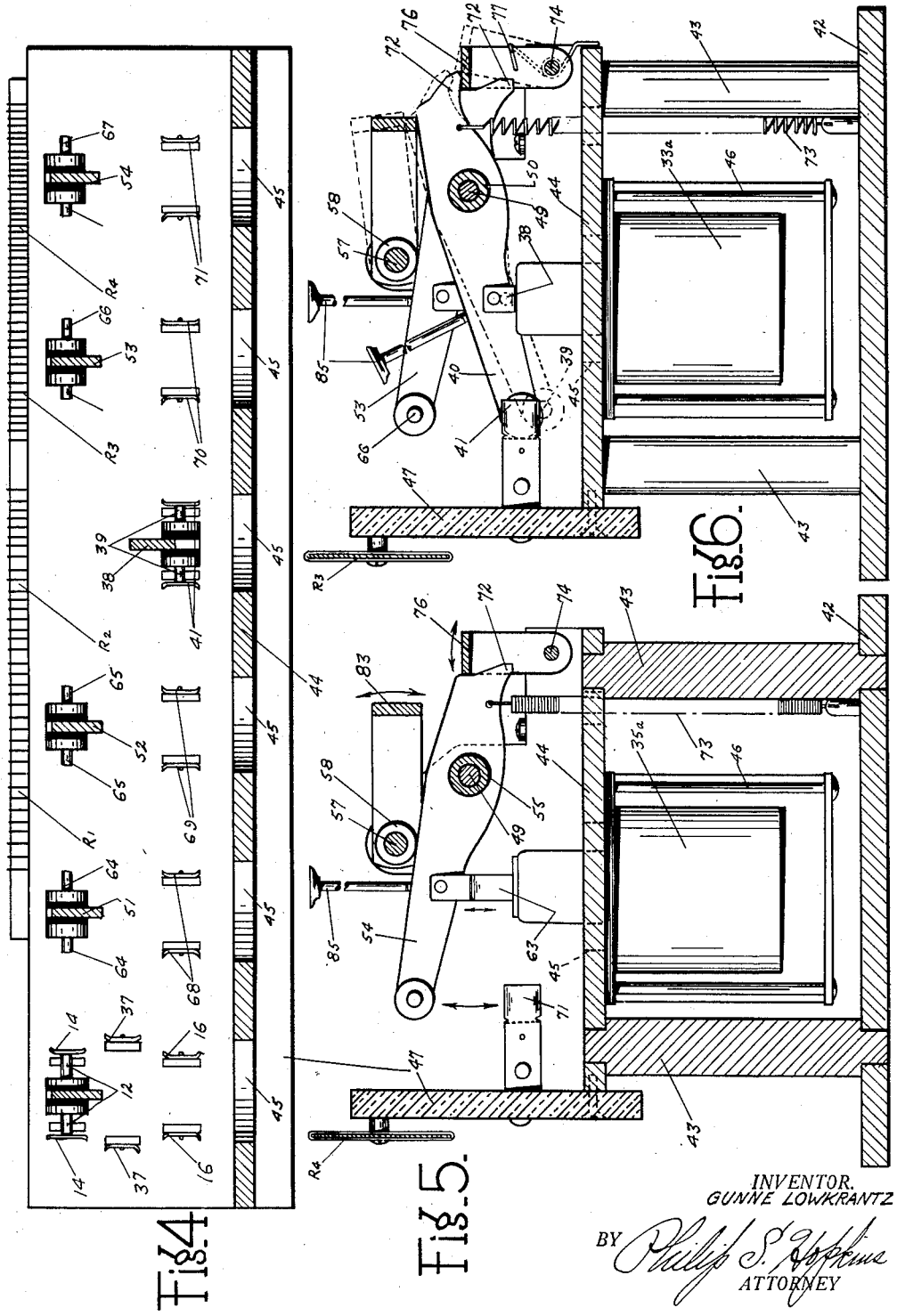

May 5, 1931. G. LOWKRANTZ 1,803,398
LIGHT CONTROL FOR PRINTERS
Filed March 26, 1928 4 Sheets-Sheet 4

INVENTOR.
GUNNE LOWKRANTZ.
BY Philip S. Hopkins
ATTORNEY

Patented May 5, 1931

1,803,398

UNITED STATES PATENT OFFICE

GUNNE LOWKRANTZ, OF BINGHAMTON, NEW YORK, ASSIGNOR TO AGFA ANSCO CORPORATION, OF BINGHAMTON, NEW YORK

LIGHT CONTROL FOR PRINTERS

Application filed March 26, 1928. Serial No. 264,785.

My invention pertains generally to a means and method for controlling the light intensity of a printing lamp used in a photographic printer, and is particularly adaptable to photographic printers of the type wherein the images on long strips of negative film, such as motion picture film, are printed upon, either by projection or in contact with, strips of positive film for subsequent development and projection.

As is well known in the art, the printing value of different sections of images on a given negative film vary, due in some instances to the difference in light under which various sections of the film were exposed, and to perhaps improper adjustment of the shutter of the taking camera. These discrepancies in printing values of the negative film strips are especially common with pictures taken by amateurs who are not always familiar with their cameras and who take pictures under greatly differing conditions and circumstances.

Obviously in printing strips of positive film from these varying negatives, the density of which perhaps changes markedly several times in the length of the strip, it is necessary that some means be provided for compensating for such variations in printing value in order that a fairly uniform positive strip may result for projection.

The primary object of my invention is to provide a method and means for automatically changing the intensity of the printing lamp, as the negative strip passes through the printer, and in this way compensate for such variations in printing values of the film.

Another object of my invention is to control this change of light intensity from the negative film itself and to bring about such change practically instantly by novel mechanism to be described.

A still further object of my invention is in producing this change of light intensity by means of a series of electric resistances through which the electric current passes to the printing lamp.

Still another object of my invention is to provide means for electrically and mechanically changing the measure of resistance between the source of electric current and the printing lamp for a given printing value, and to automatically reset the change mechanism for the next operation promptly upon the completion of such change.

A further object lies in the provision of novel selective means, controlled by the negative film, for cutting in the desired resistance units between the source of current and the lamp, whereby to vary the intensity thereof in accordance with the different densities or printing values of the film.

Other objects and advantages in details of construction and operation will be apparent as the description proceeds, reference now being had to the figures of the accompanying drawing, wherein like reference numerals indicate like parts.

In the drawings:—

Figure 2 is a top plan view of the mechanism for controlling the resistances through which the electric current passes to the printing lamp.

Figure 3 is a rear view of the mechanism taken on the line 3—3 of Figure 2, certain parts being omitted for clearness.

Figure 4 is a detail sectional view taken on the line 4—4 of Figure 2.

Figure 5 is a detail sectional view taken on the line 5—5 of Figure 2.

Figure 6 is a detail sectional view taken on the line 6—6 of Figure 2.

Figure 1:
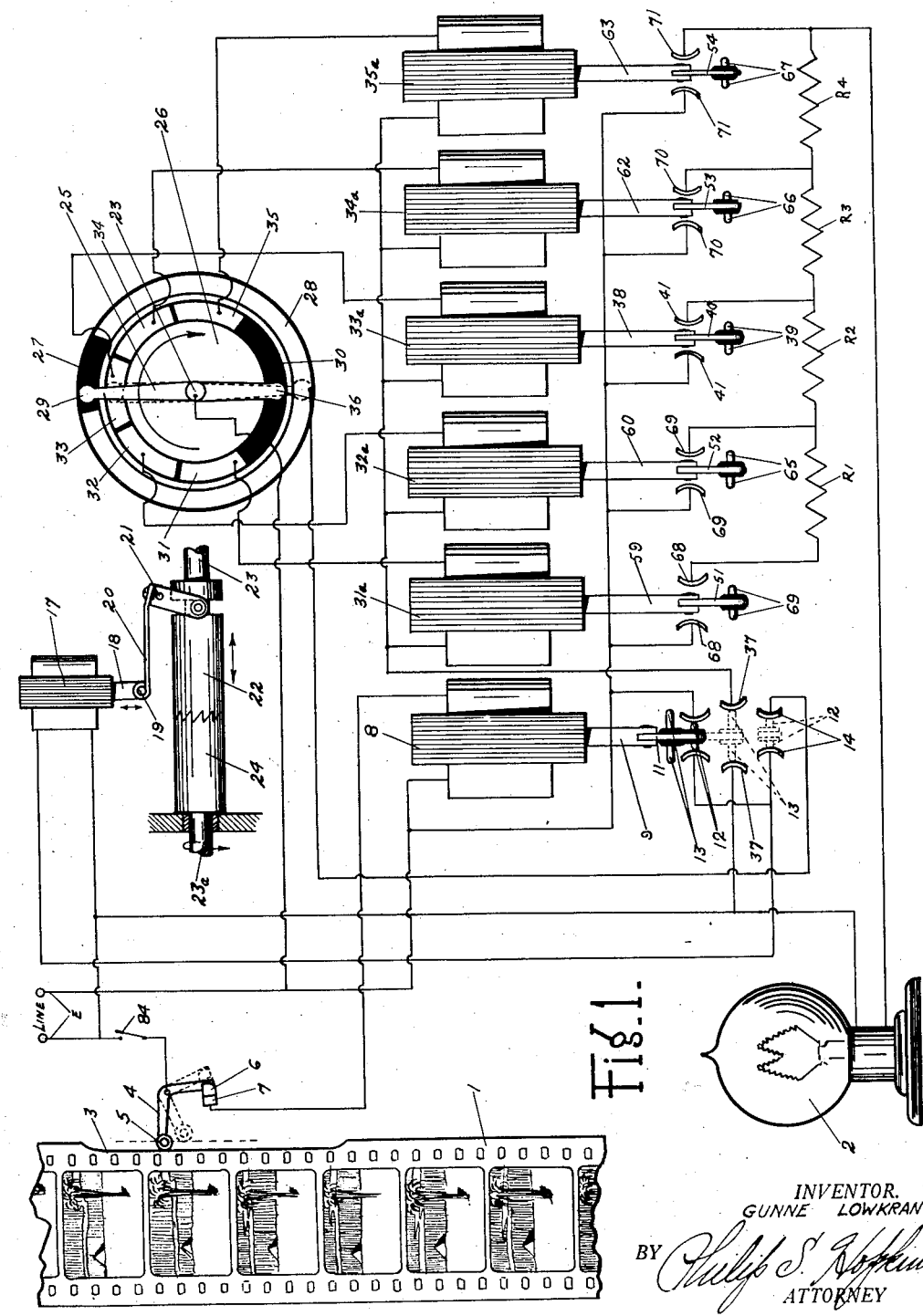
Figure 1 is a diagrammatic view illustrating the electric circuits, the method and part of the means for carrying out my invention.

Referring first to Figure 1 of the drawings, where most of the elements are indicated diagrammatically, many of the same parts being shown in full detail in the other figures of the drawing, attention is called to the strip of negative film 1, the images of which are adapted to be printed on a strip of positive film, by means of the printing lamp 2 in any desired manner, that is either by projection or by contact printing. As the printing value of the negative film 1 varies throughout its length, the intensity of the light from the printing lamp 2 should vary proportionately, that is, the more dense the film, the greater light intensity there should be from the printing lamp 2, and vice versa.

I have provided means whereby this variation in the light intensity of the lamp 2 is controlled directly by the film 1 itself, which means includes providing one edge of the film with notches of varying lengths one of which is shown at 3. A pivoted bell crank 4 is provided at one end with a roller 5 adapted to ride on the edge of the film 1 as the same moves through the printer. Obviously, when one of the notches 3 reaches the roller 5, the latter rides into such notch causing the bell crank 4 to rock on its pivot and bringing the contact 6 on the opposite end of said bell crank 4 into engagement with a stationary contact 7, these contacts remaining in engagement with each other as long as the roller 5 rides in the notch 3. In other words, the length of time during which the contacts 6 and 7 are and should be engaged is controlled and predetermined by the length of the notch 3 in the edge of the film.

Figure 7:
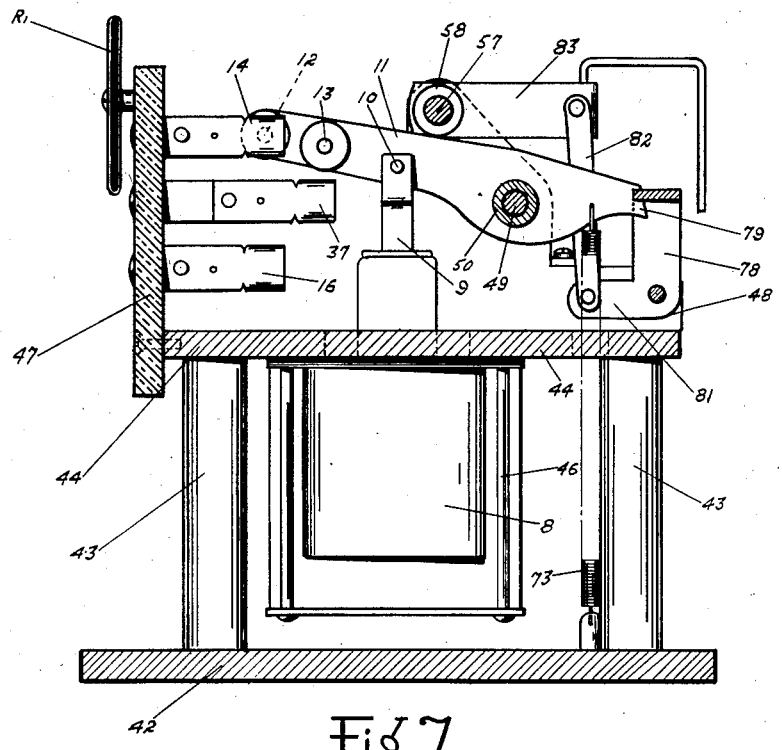
Figure 7 is a detail sectional view taken on the line 7—7 of Figure 2.

The engagement of the contacts 6 and 7 with each other serves to close a circuit through a master solenoid 8 receiving its current through a source of electricity indicated at E. This master solenoid 8 is indicated clearly in Figure 7 and it will be observed that the plunger armature 9 thereof is normally in its outward or uppermost position as shown in Figure 7. It will be observed from Figure 1 that for clearness of illustration all of the solenoids are reversed and have their plunger armatures extending downwardly.

When the solenoid 8 is energized as just described, the plunger armature 9 will be drawn downwardly (in Figure 7) or within the solenoid. Pivoted to the free end of the armature 9 as at 10 is a circuit maker comprising the arm 11, one end of which is provided with two contacts 12, and 13, each projecting on either side of the arm 11 and insulated therefrom. With the armature 9 of the solenoid in its normal position, that is before the solenoid is energized, the contacts 12 of the arm 11 are engaged with a pair of stationary contacts 14. When however, the solenoid 8 is energized and the armature 9 drawn therein, the arm 11 is rocked on its pivot 50 and the contacts 12 are pulled into engagement with a pair of stationary contacts 16. Such is the position of the parts as shown in Figure 1. Upon engagement between the contacts 12 and 16 of the master solenoid 8, a circuit is closed energizing a solenoid 17 causing the armature 18 thereof to be drawn inwardly. Pivotally secured as at 19 to the free end of the armature 18 is a lever 20 pivoted intermediate its ends as at 21 and engageable at its opposite end with a sliding clutch member 22 slidable on the shaft 23, and rotatable therewith. In alignment with the shaft 23 is a second shaft 23a secured to which is a clutch section 24 adapted to be engaged by the clutch section 22. It will be understood that during the operation of the printer of which my invention is a part, the shaft 23a and the clutch section 24 will be rotated continuously under the control of the operator and at the same speed as the film moving sprocket.

Consequently, when the solenoid 17 is energized, the arm 20 will be rocked on its pivot to slide the clutch section 22 into engagement with the clutch section 24 to cause the shaft 23 to rotate.

Mounted upon the shaft 23 (or driving by it through suitable gearing), is a selector arm 25 adapted to be rotated by the shaft 23 and in its rotation to move over and in engagement with a series of contacts of a selector or distributor indicated generally at 26. This distributor 26 comprises an outer dial which includes an insulated segment 27 and the rest of the dial comprising a stationary contact 28 of suitable electric conducting material. It should be stated here that the selector arm 25 is an electric conductor and one end 29 of this selector arm is adapted to ride over and engage with this outer dial of the distributor. The second or inner dial of the distributor comprises an insulated segment 30 and a plurality of conductor segments 31, 32, 33, 34 and 35 insulated from each other. It will be understood that there may be more or less of these conductor segments, depending upon the range of selection desired for controlling the light intensity of the lamp 2. The other end 36 of the selector arm 25 rides over and engages with this inner dial of the distributor.

In addition to the master solenoid 8, there are provided a plurality of secondary solenoids 31a, 32a, 33a, 34a and 35a, one for each of the conductor segments 31, 32, 33, 34 and 35 on the inner dial of the selector. These solenoids, in a manner to be described, are controlled by the selector in cooperation with the master solenoid 8 to effect the variation or change in the resistance to the circuit of the printing lamp 2.

It will be understood without detailed description and drawings that all of the solenoids are of typical construction having springs for normally forcing the armatures thereof outwardly.

As before described, when the master solenoid 8 is energized by the arm 4 riding into a notch on the edge of the film 1, the armature 9 thereof is drawn inwardly and closes the contacts 12 and 16 to energize the solenoid 17 which actuates the clutch member 22 and effects rotation of the shaft 23 and consequently of the selector arm 25 which moves from its circuit breaking position shown in Figure 1, that is with both ends of the arm engaged with the insulated segments 27 and 30, around the dials of the distributor, continuing such movement until the shaft 23 stops rotating by virtue of the solenoid 17 becoming de-energized and consequently the clutch member 22 again drawn out of engagement with the clutch member 24. This movement, that is the distance of the travel of the selector arm 25 around the dials is controlled by the length of the slot 3 on the edge of the film, for as soon as the roller 5 again rides up onto the edge of the film, the arm 4 will be rocked on its pivot to break the contacts 6 and 7 and de-energize the master solenoid 8 whereupon the armature 9 thereof moves outwardly of the solenoid 8 to separate the contacts 12 and 16. As the contacts 12 and 16 are separated, the solenoid 17 is de-energized and the armature 18 thereof assumes its normal outward position to disengage the clutch sections 22 and 24 and thus stop the rotation of the shaft 23, thus leaving the selector arm 25 in engagement at its ends with the conducting portion 28 of the outer dial and one of the conducting segments of the inner dial, depending of course upon the distance which the selector arm has traveled. For illustration, we will assume that the selector arm 25 has traveled to the position shown in dotted lines in Figure 1, namely, with the end 29 thereof engaging the outer conducting section 28 and the end 36 thereof engaging the conducting segment 33 of the inner dial. In such position, the selector arm, through the distributor dials, makes possible a circuit through the solenoid 33a, which circuit is closed by means of the contacts 13 on the arm 11 of the master solenoid engaging with the stationary contacts 37 in the path of the contacts 13 as the armature 9 of the master solenoid moves toward its normal outward position. It should be stated here that the armature 9 and the arm 11 are mechanically arrested in their outward movement to normal position, by means to be described, in position to permit this contact between the contacts 13 and 37.

As before stated, the engagement of the contacts 13 and 37 closes a circuit through the distributor to the solenoid 33a energizing the latter and causing the armature 38 thereof to be drawn inwardly, bringing the contacts 39 carried by one end of an arm 40 pivoted between its ends to the armature 38 into engagement with contacts 41 and thus cutting into the circuit of the lamp 2 the resistance units R3 and R4.

It will be understood of course that if the length of the notch in the edge of the film is longer or shorter than the notch 3 just described, the selector arm 25 will travel a greater or less distance dependent entirely upon the length of the notch and will therefore come to rest with the end 36 in contact with one of other conducting segments of the inner dial on the distributor, which as shown clearly in the diagram of Figure 1 will make possible the closing of a circuit to one of the other solenoids than 33a, depending of course upon the circuits from the distributor to such solenoids, whereby the engagement of the contacts 13 and 37 of the master solenoid will result in energizing the particular selected solenoid and as a result cut into the lamp circuit the appropriate number of resistance units in the manner just above described.

It was stated before that the return movement of the armature 9 and 11 of the master solenoid 8 to outward or normal position was retarded mechanically at the point where the contacts 13 and 37 engage. The mechanism and this retarding action and for subsequently releasing the contacts 13 and 37 and permitting the armature 9 and arm 11 to assume their normal positions and with the contacts 12 and 14 in engagement, will now be described, together with the operations incident thereto.

Referring now particularly to Figures 2 to 7 inclusive, there is provided a base member 42 provided with upstanding supporting posts 43 mounted upon which is a plate 44 provided with central openings 45 through which the armatures of the solenoids project upwardly and directly beneath which are suitably mounted in brackets 46, the solenoids themselves. Along one side of the plate 44 is an upstanding panel 47 of insulating material upon which are mounted the various stationary contacts with which the movable contact members of the solenoid armatures are adapted to engage, and the resistance units R1, R2, R3 and R4. At the ends of the plate 44 on the side opposite the panel 47 are upstanding brackets 48 between which is mounted a shaft 49 extending the full length of the plate 44 and rotatable on this shaft 49 are rotatable sleeves 50, one for each of the arms 11, 51, 52, 40, 53 and 54 secured to such sleeves whereby said arms are pivotally mounted intermediate their ends on the shaft 49. Rotatable spacing sleeves 55 are located on the shaft 49 between each of the sleeves 50, acting as anti-friction devices to prevent communicating the movement of any of the sleeves 50 to the adjacent sleeve. An intermediate bracket 56 may be provided centrally of the plate 44 for additional support to the shaft 49.

Likewise supported in the brackets 48 and 56 and extending lengthwise of the plate 44 is a second shaft 57 provided at intervals with sleeves 58 directly overlying the upper edges of the pivoted arms 11, 51, 52, 40, 53 and 54. These sleeves 58 limit the upward movement of the said pivoted arms and are preferably of fiber, rubber, or other suitable material for breaking the blow of the pivoted arms when thrown thereagainst, and eliminating largely the noise incident thereto. It will be observed with reference to Figures 5, 6 and 7 particularly that the shaft 57 and the sleeves 58 are so positioned as to limit the upward movement of the pivoted arms 11, 51, 52, 40, 53 and 54 on the solenoid armatures to a position in which the contacts of the secondary solenoids in operative position, in other words, their normal position, and in which the contacts 12 and 14 of the master solenoid are in engagement.

It will be clear from Figure 2 that the solenoids 8, 31a, 32a, 33a, 34a and 35a are in alignment with each other and each one disposed directly beneath one of the openings 45 in the plate 44. The solenoid 31a is provided with the plunger armature 59 to the free end of which is pivoted the arm 51. The armature 60 of the solenoid 32a has pivoted thereto the arm 52. The armature 62 of the solenoid 34a has pivoted thereto the arm 53 and similarly the armature 63 of the solenoid 35a has pivoted thereto the arm 54. As shown, the various armatures of these solenoids are bifurcated at their upper ends to provide pivot means for the various arms. The arms 51, 52, 40, 53 and 54 are all provided at one end with contact members 64, 65, 39, 66 and 67 respectively, such contact members being engageable when the solenoids are energized or the arms locked, with the stationary contact members 68, 69, 41, 70 and 71 respectively, all mounted upon the panel 47.

Each of the opposite ends of the pivoted arms 51, 52, 40, 53 and 54 is provided with a nose 72, the upper side of which is slightly bevelled. Coil springs 73 are engaged at one end adjacent the nose 72 of these arms and are anchored at their lower ends to the base 42 whereby to normally rock the rear ends of the arms downwardly thereby bringing the contact members on the opposite ends of such arms out of engagement with the stationary contacts on the panel 47.

Extending lengthwise of the plate 44 and supported in the brackets 48 and 56 is a pintle 74 pivoted upon which are the downwardly extending legs 75 of an elongated substantially U-shaped lock bar 76 extending across and just to the rear ends of the pivoted arms and normally held in engagement with the upper sides of the nose 72 of such arms by means of the coil spring 77 (see Figure 3). Obviously, therefore, when any one of the secondary solenoids 31a, 32a, 33a, 34a, or 35a is energized in the manner heretofore described, the pivoted arm attached to the armature of the particular solenoid so energized, will be rocked on its pivot in such manner as to lower the contact members carried at one end thereof into engagement with the stationary contacts on the panel 47, and at the same time raise the opposite end of the arm against the tension of the coil spring 73, the bevelled upper surface of the nose 72 serving to rock the locking bar 76 as shown in Figure 6 until the nose 72 has passed the same, whereupon the spring 77 will return the locking bar to normal horizontal position with the nose 72 resting on top thereof and thus preventing the return of the pivoted arm to the normal position shown in Figure 5 until the locking bar 76 has again been rocked on its pivot to release the nose 72. From the construction just described, it will be clear that with one of the solenoids energized, such as for instance, the solenoid 33a, the contacts 39 and 41 thereof will be locked in circuit closing position so that the resistance units appropriate thereto will be in circuit with the lamp 2. It will be likewise understood that when another one of the solenoids is energized, the locking bar 76 will be again rocked on its pivot, as before described, thus releasing the particular pivoted arm, in this case 40, and permitting it to return to normal position under the influence of the spring 33, while the pivoted arm of the solenoid newly energized becomes locked with its nose 72 over the locking bar 76, and with its contacts making circuit through the appropriate resistance units.

It will be noted now with reference to Figures 2, 3 and 7 that there is pivoted upon the pintle 74 directly to the rear of the pivoted arm 11 of the master solenoid 8, a second and shorter U-shaped locking bar 78, normally positioned against the rear of the nose 79 of the arm 11, the locking bar 78 being provided with a notch 80 into which the nose 79 extends. The upper side of this nose 79 is bevelled and it will be clear that upon the energizing of the master solenoid 8 and the rocking of the arm 11 to bring the contact members 12 downwardly into engagement with the contacts 16, the nose 79 will ride upwardly past the locking bar 78, rocking the same on its pivot to permit the nose 79 to pass the same after which it returns to its normal vertical position and beneath the nose 79 whereby to hold the arm 11, in such position. This locking bar 78 is provided at one end with a forwardly extending ear 81 to which is attached the lower end of a link 82, the upper end of which is pivoted to a U-shaped bracket 83 pivoted upon the shaft 57 and lying in a horizontal position directly over the rear ends of the pivoted arms 51, 52, 40, 53 and 54 and in position to be engaged by each of the pivoted arms when the solenoid to which the same is attached is energized as before described. It will be noted with reference to Figure 6, that when a given solenoid, as for instance 33a is energized, the arm 40 thereof will be rocked on its pivot to the position shown in dotted lines, in other words far enough to permit the rear end of said arm 40 to engage with the bracket 83 and rock the same upwardly on its pivot slightly, this resulting through the medium of the link 82 in rocking the locking bar 78 slightly on its pivot sufficient to permit the nose 79 of the arm 11 of the master solenoid 8 to be released from said locking bracket and permit said arm 11 to return to the normal position shown in Figure 7 under the influence of its spring 73. This of course brings the contacts 12 of the arm 11 back into engagement with the contacts 14 on the panel 47 for a purpose to be described. It will be clear therefore, that upon the actuation of any one of the secondary solenoids, the pivoted arm 11 of the master solenoid will be permitted to return to its normal position while the particular secondary solenoid so energized or actuated has its pivoted arm automatically locked by the locking bar 76 until one of the other secondary solenoids, is energized and has its pivoted arm so locked and at the same time releasing the first one.

The operation of my invention is as follows:—

Assuming that the negative film 1 has been examined and edited by the operator and that the notches have been provided in one edge of such film adjacent the points where the light intensity of the printing lamp 2 is to be changed in accordance with the density or printing value of the film at such points, the length of the notches 3 of the film being predetermined with respect to the particular resistance units which are to be cut into the lamp circuit at such points on the film, and the film started through the printer. Assuming now that the notch 3 on the film reaches the roller 5, said roller will ride into the notch, closing the contacts 6 and 7 resulting in energizing the master solenoid 8 drawing the armature 9 thereof inwardly so that the contacts 12 on the pivoted arm 11 engage with the lowermost contacts 16 on the panel 47. This rocking of the arm 11 results in bringing the nose 79 on the rear end thereof above the locking bar 78, which bar immediately resumes its normal vertical position now beneath the nose 79. The engagement of the contacts 12 and 16 closes the circuit to the solenoid 17 energizing the same resulting in drawing inwardly the armature 18 thereof and rocking the arm 20 on its pivot to engage the clutch section 22 with the rotating clutch section 24 and starting the rotation of the shaft 23 and selector arm 25. This condition continues, that is, the contacts 12 and 16 remain engaged and the clutch sections 22 and 24 remain engaged until the roller 5 again rides out of the notch 3 onto the edge of the film. At such point the contacts 6 and 7 are disengaged and the circuit broken to the master solenoid 8, which is then de-energized, permitting the armature 9 to return toward normal position, a distance sufficient to bring the contacts 13 on the arm 11 into engagement with the contacts 37 on the panel 47, in which position the arm 11 is locked against further movement toward normal position by means of the nose 79 engaging the top of the locking bar 78. It will be understood, of course, that the instant the contacts 12 are removed from engagement from the contacts 16, the solenoid 17 will be deenergized and the clutch section 22 withdrawn from the clutch section 24, thus stopping the rotation of the shaft 23 and selector arm 25, which latter will have assumed a predetermined position on the distributor dials, in accordance with and dependent upon the predetermined length of the notch which has produced this operation, as for instance with the end 29 of the selector arm engaging with the conducting segment 28 of the outer dial and with the end 36 of such arm contacting with the segment 33 of the inner dial. In this position, it will be clear from the diagram in Figure 1 that the circuit is now possible through the distributor 26 to the solenoid 33a and that promptly upon the movement of the contacts 13 on the arm 11 of the master solenoid into engagement with the contacts 37 on the panel 47, the solenoid 33a will be energized drawing the armature 38 thereof inwardly to bring the contacts 39 on the pivoted arm 40 of such solenoid into engagement with the contacts 41 on the panel 47, thus cutting into the circuit of the lamp 2, the resistance units R3 and R4 whereby the intensity of the lamp 2 is reduced to correspond to the printing value of the film 1 at that point.

As before described, when the solenoid 33a is energized, the pivoted arm 40 thereof, rocking upon its pivot to bring its contact members 39 into engagement with the contacts 41, rocks the locking bar 76 on its pivot and, continuing upwardly to the dotted line position shown in Figure 6, rocks the bracket 83 on its pivot, which through the link 82 rocks the locking bar 78 on its pivot thus permitting the spring 73 to return the arm 11 to its normal position, disengaging the contacts 13 and 37 and again engaging contacts 12 and 14. The pivoted arm 40 of the solenoid 33a of course remains locked with its nose 72 engaging the locking bar 76 and the contacts 39 engaging with the contacts 41.

It will be remembered that during these operations, the selector arm 25 has been in position between the conducting segments 28 and 33 of the distributor to permit the energizing of the solenoid 33a. After this energizing has taken place, however, and the arm 40 carrying the contacts for this solenoid has been locked in position to maintain the desired resistance units in circuit with the lamp 2, it is necessary that the selector arm be returned to its normal or starting position, namely, with its ends engaging with the insulated segments 27 and 38 in order that when another notch in the film, of perhaps a different length and calling for a different solenoid to be energized in order to again vary the resistance in the lamp circuit, the distributor or selector device will be ready for such operation. This is accomplished by means of the master solenoid again returning to its normal position with the contacts 13 in engagement with the contacts 14 after having energized the solenoid 33a by means of the contacts 13 and 37. As has just been explained, as soon as the solenoid 33a has been energized, the pivoted arm 11 of the master solenoid is unlocked and permitted to return to the position where the contacts 12 engage the contacts 14. When this engagement takes place, a circuit is again closed, as clearly shown in Figure 1, to the solenoid 17 energizing the same and again shifting the clutch section 22 into engagement with the section 24, whereupon the selector arm 25 continues its rotation about the dial until the ends of the arm 25 reach the insulated sections 27 and 30, whereupon the circuit to the solenoid 17 is broken, the same de-energized and the clutch sections 22 and 24 again separated, thus stopping the selector arm 25 with its ends on the insulated segments of the dials.

When the next notch in the film reaches the roller 5, the operations just described will be repeated and the particular solenoid to be energized by the contacts 13 and 37 of the master solenoid depends entirely upon the length of the notch in the film, and therefore, the distance that the selector arm travels around the dials of the distributor or selector. It naturally follows also that the number of resistance units cut into the circuit of the lamp 2 likewise directly depends upon the length of the notch in the film and the position at which the selector arm stops on the dials.

I have described the operation of my invention specifically with reference to the solenoid 33a, which acts to cut in the resistance units R3 and R4. It will be understood, however, that the same operation applies to all the other secondary solenoids, which cut in more or less of the resistance units R1 to R4 inclusive, depending as before stated, on the predetermined length of the notch in the edge of the film.

The operation of the device is continuous and it will be clear from the foregoing description of the locking and releasing means for the pivoted arms of each solenoid that if for instance the arm 40 of the solenoid 33a has been actuated and is locked in position as shown in Figure 6, and the next notch in the film causes the actuation of for instance the solenoid 32a, the movement of the armature 60 thereof causes the rocking of the pivoted arm 52, the nose 72 of which rocks the locking bracket 76 on its pivot, thus unlocking the arm 40 of the solenoid 33a and locking the arm 52 of the solenoid 32a. In such position, the contacts 65 of the arm 52 engage with the contacts 69 on the panel 47 cutting in the resistance units R2, R3, and R4 in the circuit to the lamp 2. In other words, the operation of any one of the secondary solenoids automatically unlocks the contacts of any other of these solenoids and locks the contacts of the actuated solenoid in position and, as before explained, during such unlocking operation, releases the arm 11 of the master solenoid.

It will thus be seen that I have provided an automatic light change control for the printing lamp 2, the entire operation of which for a given strip of negative film is determined by the notches of predetermined length formed on such film.

In some instances, as for example, with short lengths of film, the operator may not desire to go to the trouble of notching the film 1 to bring about the automatic light change control, but desire to effect such control manually. In such event, the switch 84 between the contacts 6 and 7 and the source of current to the master solenoid and the clutch solenoid 17 may be opened, thus providing against electric operation of the controlling solenoids. It will be noted with reference to Figures 2, 5 and 6 that the pivoted arms of the solenoids 31a, 32a, 33a, 34a and 35a are provided with upwardly projecting finger pieces 85 whereby the operator may by depressing any desired finger piece effect the rocking of the selected pivoted arm to cut in the desired resistance by means of the contacts carried by such arm engaging the corresponding stationary contacts on the panel 47. The actuating pivoted arms will be of course locked in such position by means of the locking bar 76 as before, and released from such bar upon the subsequent actuation of a different finger piece.

Of course, many changes may be made in details of construction and arrangement of parts without departing from the spirit and scope of my invention. I do not limit myself, therefore, to the exact structure herein shown and described, other than by the appended claims.

I claim:—

1. A light change control for printers including in combination, a strip of film having notches in its edge of different predetermined lengths, a printing lamp, a series of resistance units adapted to be selectively cut into the circuit of said lamp, means operated by said notches and controlled by the length thereof for selectively cutting one or more of said units into said lamp circuit, said means comprising a master solenoid and a plurality of secondary solenoids, means on said secondary solenoids for establishing circuits through said units and means on said master solenoid for closing said circuits.

2. A light change control for printers including in combination, a strip of film having notches in its edge of different predetermined lengths, a printing lamp, a series of resistance units adapted to be selectively cut into the circuit of said lamp, means operated by said notches and controlled by the length thereof for selectively cutting one or more of said units into said lamp circuit, said means comprising a master solenoid and a plurality of secondary solenoids, means on said secondary solenoids for establishing circuits through said units and means on said master solenoid for closing said circuits, and means operable by said master solenoid and controlled by the length of said notches, for selecting the circuit to be closed by said master solenoid.

3. A light change control for printers including in combination, a strip of film having notches in its edge of different predetermined lengths, a printing lamp, a series of resistance units adapted to be selectively cut into the circuit of said lamp, means operated by said notches and controlled by the length thereof for selectively cutting one or more of said units into said lamp circuit, said means comprising a master solenoid and a plurality of secondary solenoids, means on said secondary solenoids for establishing circuits through said units and means on said master solenoid for closing said circuits, and means operable by said master solenoid and controlled by the length of said notches, for selecting the circuit to be closed by said master solenoid, said selecting means comprising a contact arm movable from an insulated position over a series of conductor segments to establish circuits to said secondary solenoids.

4. A light change control for printers including in combination, a strip of film having notches in its edge of different predetermined lengths, a printing lamp, a series of resistance units adapted to be selectively cut into the circuit of said lamp, means operated by said notches and controlled by the length thereof for selectively cutting one or more of said units into said lamp circuit, said means comprising a master solenoid and a plurality of secondary solenoids, means on said secondary solenoids for establishing circuits through said units and means on said master solenoid for closing said circuits, and means operable by said master solenoid and controlled by the length of said notches, for selecting the circuit to be closed by said master solenoid, said selecting means comprising a contact arm movable from an insulated position over a series of conductor segments to establish circuits to said secondary solenoids, and means operated by said master solenoid for returning said contact arm to its normal insulated position.

5. A light change control for printers including in combination, a strip of film having notches of different predetermined lengths in its edge, a printing lamp, a series of resistance units adapted to be selectively cut into the circuit of said lamp, means operated by said notches and controlled by the length thereof for selectively cutting one or more of said units into said lamp circuit, said means comprising a master solenoid and a plurality of secondary solenoids, pivoted circuit makers operable by said secondary solenoids for establishing circuits through said units, and a pivoted circuit maker operable by said master solenoid for closing said circuits, said circuit makers being rockable on their pivots to circuit making position by said solenoids, and resilient means normally urging them out of circuit making position.

6. A light change control for printers including in combination, a strip of film having notches of different predetermined lengths in its edge, a printing lamp, a series of resistance units adapted to be selectively cut into the circuit of said lamp, means operated by said notches and controlled by the length thereof for selectively cutting one or more of said units into said lamp circuit, said means comprising a master solenoid and a plurality of secondary solenoids, pivoted circuit makers operable by said secondary solenoids for establishing circuits through said units, and a pivoted circuit maker operable by said master solenoid for closing said circuits, said circuit makers being rockable on their pivots to circuit making position by said solenoids, and resilient means normally urging them out of circuit making position, and means for releasably locking said circuit makers to circuit making position when moved thereto.

7. A light change control for printers including in combination, a strip of film having notches of different predetermined lengths in its edge, a printing lamp, a series of resistance units adapted to be selectively cut into the circuit of said lamp, means operated by said notches and controlled by the length thereof for selectively cutting one or more of said units into said lamp circuit, said means comprising a master solenoid and a plurality of secondary solenoids, pivoted circuit makers operable by said secondary solenoids for establishing circuits through said units, and a pivoted circuit maker operable by said master solenoid for closing said circuits, said circuit makers being rockable on their pivots to circuit making position by said solenoids, and resilient means normally urging them out of circuit making position, and means for releasably locking said circuit makers to circuit making position when moved thereto, and means operable upon the movement of certain said circuit makers to circuit making position for releasing any other of circuit makers from such position.

GUNNE LOWKRANTZ.